US008601248B2

(12) United States Patent
Thorsted

(10) Patent No.: US 8,601,248 B2
(45) Date of Patent: Dec. 3, 2013

(54) DISK DRIVE BOOTING FROM VOLATILE SEMICONDUCTOR MEMORY WHEN EXITING POWER SAVE MODE

(75) Inventor: Wayne A. Thorsted, Berthoud, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 430 days.

(21) Appl. No.: 13/073,032

(22) Filed: Mar. 28, 2011

(65) Prior Publication Data

US 2012/0254601 A1 Oct. 4, 2012

(51) Int. Cl.
*G06F 1/32* (2006.01)
*G06F 15/177* (2006.01)

(52) U.S. Cl.
USPC .................................... 713/1; 713/2; 713/320

(58) Field of Classification Search
None
See application file for complete search history.

(56) References Cited

U.S. PATENT DOCUMENTS

| | | | |
|---|---|---|---|
| 5,365,487 A | 11/1994 | Patel et al. | |
| 6,199,139 B1 | 3/2001 | Katayama et al. | |
| 6,212,599 B1 | 4/2001 | Baweja et al. | |
| 6,226,740 B1 * | 5/2001 | Iga | 713/2 |
| 6,587,300 B1 * | 7/2003 | Dobbek | 360/75 |
| 6,874,095 B2 | 3/2005 | Usui | |
| 6,968,469 B1 | 11/2005 | Fleischmann et al. | |
| 7,032,105 B2 | 4/2006 | Lin | |
| 7,047,356 B2 | 5/2006 | Chen | |
| 7,725,746 B2 | 5/2010 | Lee et al. | |
| 2003/0005223 A1 * | 1/2003 | Coulson et al. | 711/118 |
| 2007/0136523 A1 | 6/2007 | Bonella et al. | |
| 2008/0086591 A1 * | 4/2008 | Miyajima | 711/104 |
| 2009/0292934 A1 | 11/2009 | Esliger | |

* cited by examiner

*Primary Examiner* — Dennis M Butler

(57) ABSTRACT

A disk drive is disclosed comprising a head actuated over a disk, a first volatile semiconductor memory (VSM), and a second VSM. When the disk drive is powered on, control circuitry first reads VSM initialization code from the disk, first initializes the first VSM using the VSM initialization code, stores the VSM initialization code in the second VSM, and then enters a power save mode. When exiting the power save mode, the control circuitry second initializes the first VSM using the VSM initialization code stored in the second VSM.

22 Claims, 6 Drawing Sheets

DISK DRIVE BOOTING FROM VOLATILE SEMICONDUCTOR MEMORY WHEN EXITING POWER SAVE MODE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

A disk drive typically comprises a boot read only memory (ROM) for storing boot code used to boot the disk drive when initially powered on. The boot code typically includes a disk initialization procedure to enable control circuitry to read additional boot code form the disk. The boot code read from the disk typically includes a volatile semiconductor memory (VSM) initialization procedure to initialize a VSM such as a double data rate (DDR) random access memory (RAM). Once the VSM is initialized, the remaining boot code is read from the disk into the VSM and then executed from the VSM in order to finish booting the disk drive.

BRIEF DESCRIPTION OF THE DRAWINGS

FIG. 2B is a flow diagram according to an embodiment of the present invention wherein the VSM initialization code is read from the disk when the disk drive is powered on.

DETAILED DESCRIPTION OF EMBODIMENTS OF THE INVENTION

Figures 1A, 1B:
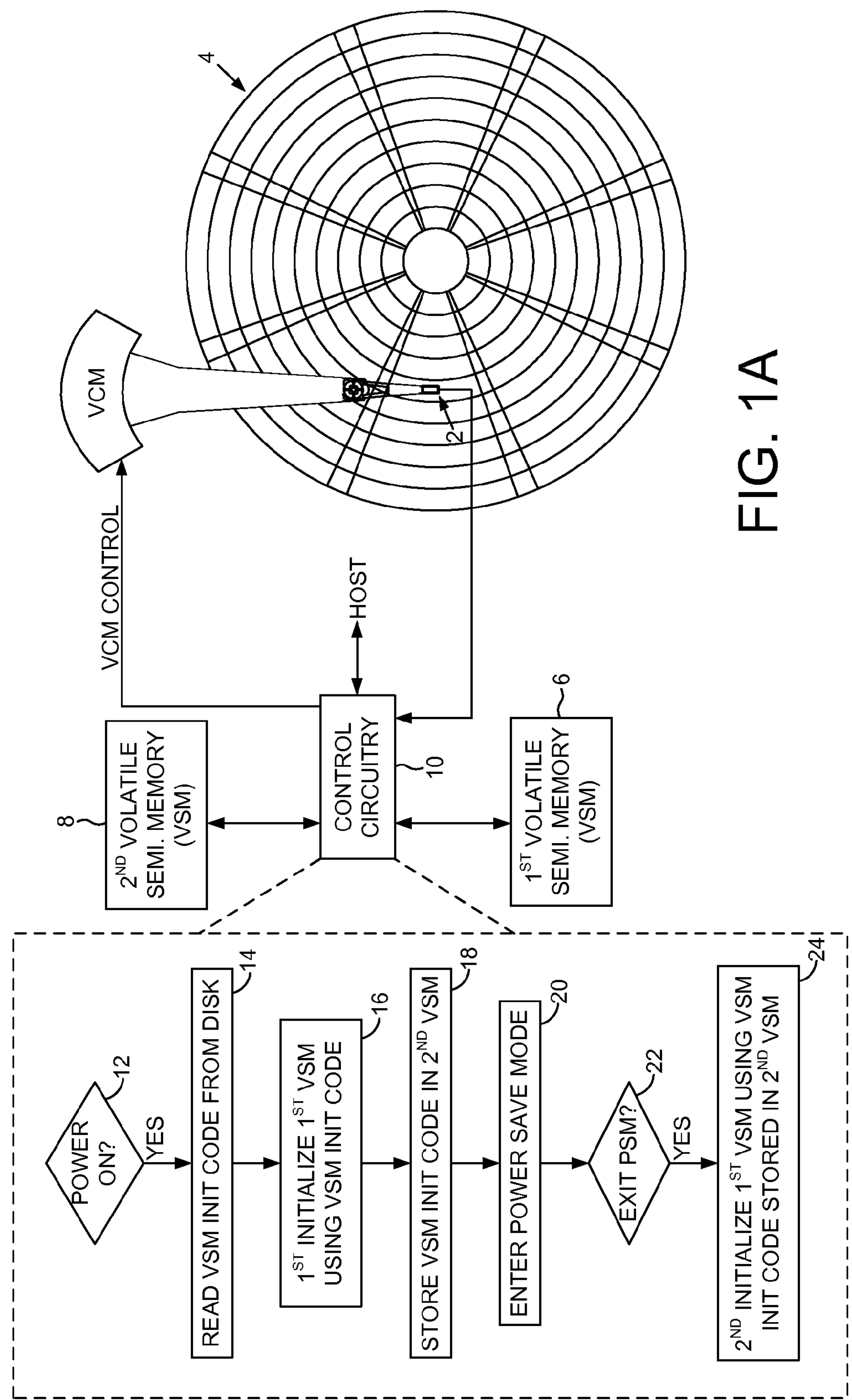
FIG. 1A shows a disk drive according to an embodiment of the present invention comprising a head actuated over a disk, and first and second volatile semiconductor memories (VSMs).
FIG. 1B is a flow diagram according to an embodiment of the present invention wherein prior to entering a power save mode, VSM initialization code for initializing the first VSM is stored in the second VSM and used to reinitialize the first VSM when exiting the power save mode.

FIG. 1A shows a disk drive according to an embodiment of the present invention comprising a head 2 actuated over a disk 4, a first volatile semiconductor memory (VSM) 6, and a second VSM 8. The disk drive further comprises control circuitry 10 operable to execute the flow diagram of FIG. 1B, wherein when the disk drive is powered on (step 12), the control circuitry first reads VSM initialization code from the disk (step 14), first initializes the first VSM using the VSM initialization code (step 16), stores the VSM initialization code in the second VSM (step 18), and then enters a power save mode (step 20). When exiting the power save mode (step 22), the control circuitry second initializes the first VSM using the VSM initialization code stored in the second VSM (step 24).

In the embodiments of the present invention, the first VSM 6 must be initialized before it may be accessed when the disk drive is powered on, as well as after exiting the power save mode. The fist VSM may be initialized, for example, by initializing an internal state machine and/or user-defined operating parameters. In an embodiment described in greater detail below, the first VSM may be initialized by writing control values to specific registers within the first VSM. The initialization sequence typically varies based on the vendor of the first VSM which means the VSM initialization code is typically not stored in a read only memory (ROM) such as a boot ROM but instead written to the disk. In this manner, the same boot ROM may be installed in a number of disk drives regardless as to the type of first VSM installed. When the disk drive is powered on, the VSM initialization code is read from the disk and used to initialize the first VSM. As described in greater detail below, in the embodiments of the present invention the latency of spinning up the disk when exiting the power save mode is avoided by storing the VSM initialization code in the second VSM prior to entering the power save mode.

Figure 2A:
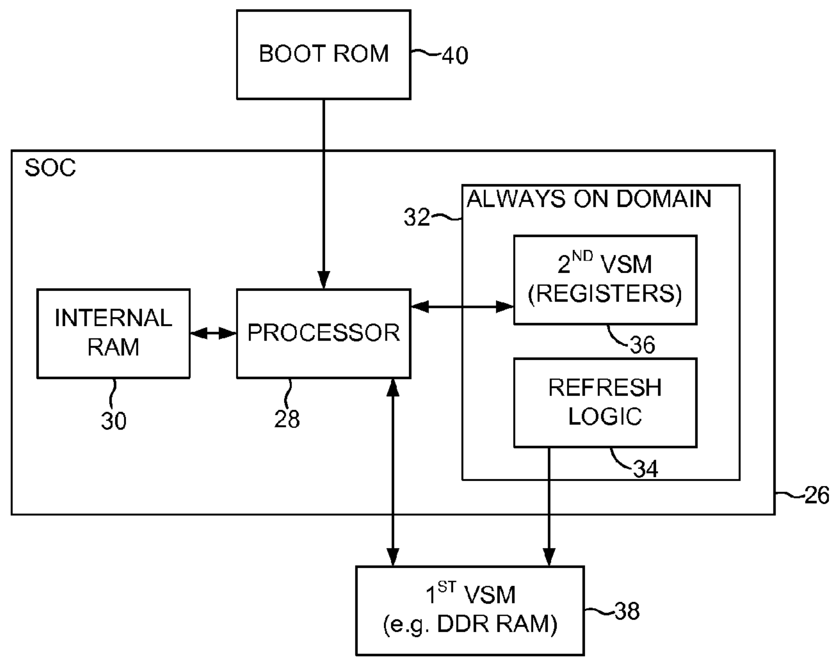
FIG. 2A shows an embodiment of the present invention wherein the first VSM comprises a double data rate (DDR) random access memory (RAM), and the second VSM comprises always on domain (AOD) registers within a system on a chip (SOC).

Any suitable first VSM 6, second VSM 8, and control circuitry 10 may be employed in the embodiments of the present invention. FIG. 2A shows an embodiment wherein the control circuitry 10 comprises a system on a chip (SOC) 26 comprising a processor 28, an internal RAM 30, and an always on domain (AOD) 32 comprising refresh logic 34 and a plurality of AOD registers 36. In this embodiment, the second VSM comprises a plurality of the AOD registers 36. The AOD of FIG. 2A remains powered when the disk drive enters the power save mode so that the AOD registers 36 retain the VSM initialization code. In one embodiment, the refresh logic 34 also periodically refreshes the first VSM while in the power save mode, wherein in the embodiment of FIG. 2A the first VSM comprises a double data rate (DDR) RAM 38. The control circuitry in the embodiment of FIG. 2A further comprises a boot ROM 40 which stores initial boot code for the disk drive, including the code that determines whether to finish booting from the disk or from the first and second VSMs as described below.

Figure 2B:
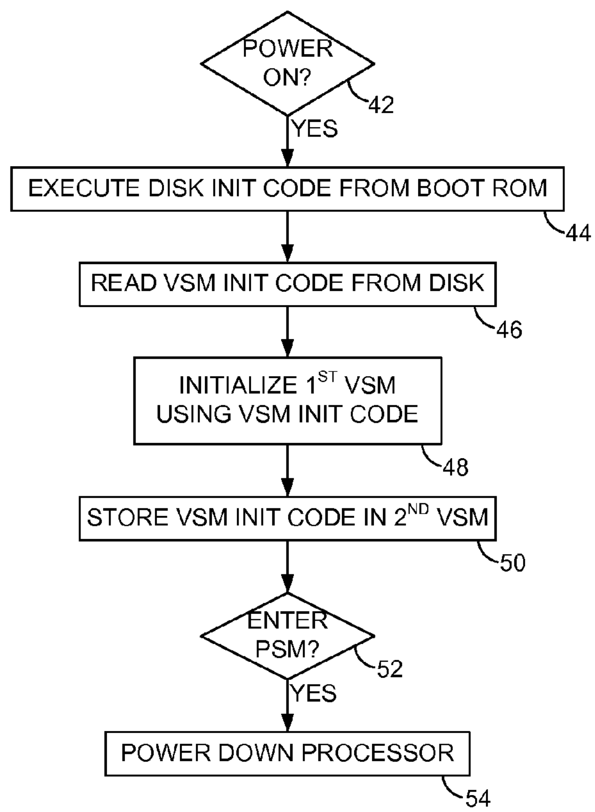

FIG. 2B is a flow diagram according to an embodiment of the present invention wherein when the disk drive is powered on (step 42), disk initialization code is read from the boot ROM and executed in order to configure the control circuitry with parameters needed to access the disk (step 44). The VSM initialization code is then read from the disk (step 46) and executed in order to initialize the first VSM (step 48). The VSM initialization code is also stored in the second VSM at step 50 (such as the AOD registers 36 of FIG. 2A). When the disk drive enters a power save mode (step 52), at least part of the control circuitry is powered down at step 54 (such as the processor 28 of FIG. 2A). When exiting the power save mode, the processor 28 is powered on and the VSM initialization code stored in the second VSM (e.g., the AOD registers 36) is executed in order to reinitialize the first VSM.

Figure 3A:
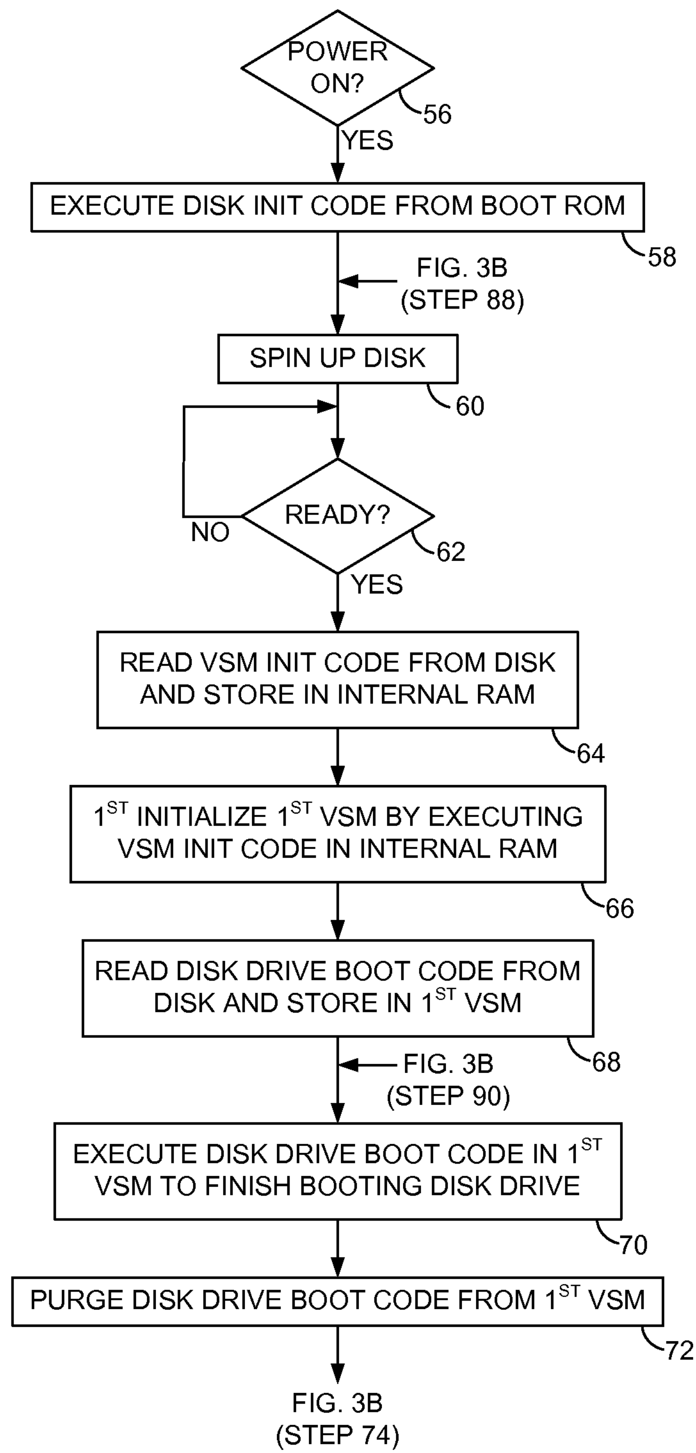
FIGS. 3A and 3B show a flow diagram according to an embodiment of the present invention wherein disk drive boot code is stored in the first VSM prior to entering the power save mode and then used to boot the disk drive when exiting the power save mode.
Figure 3B:
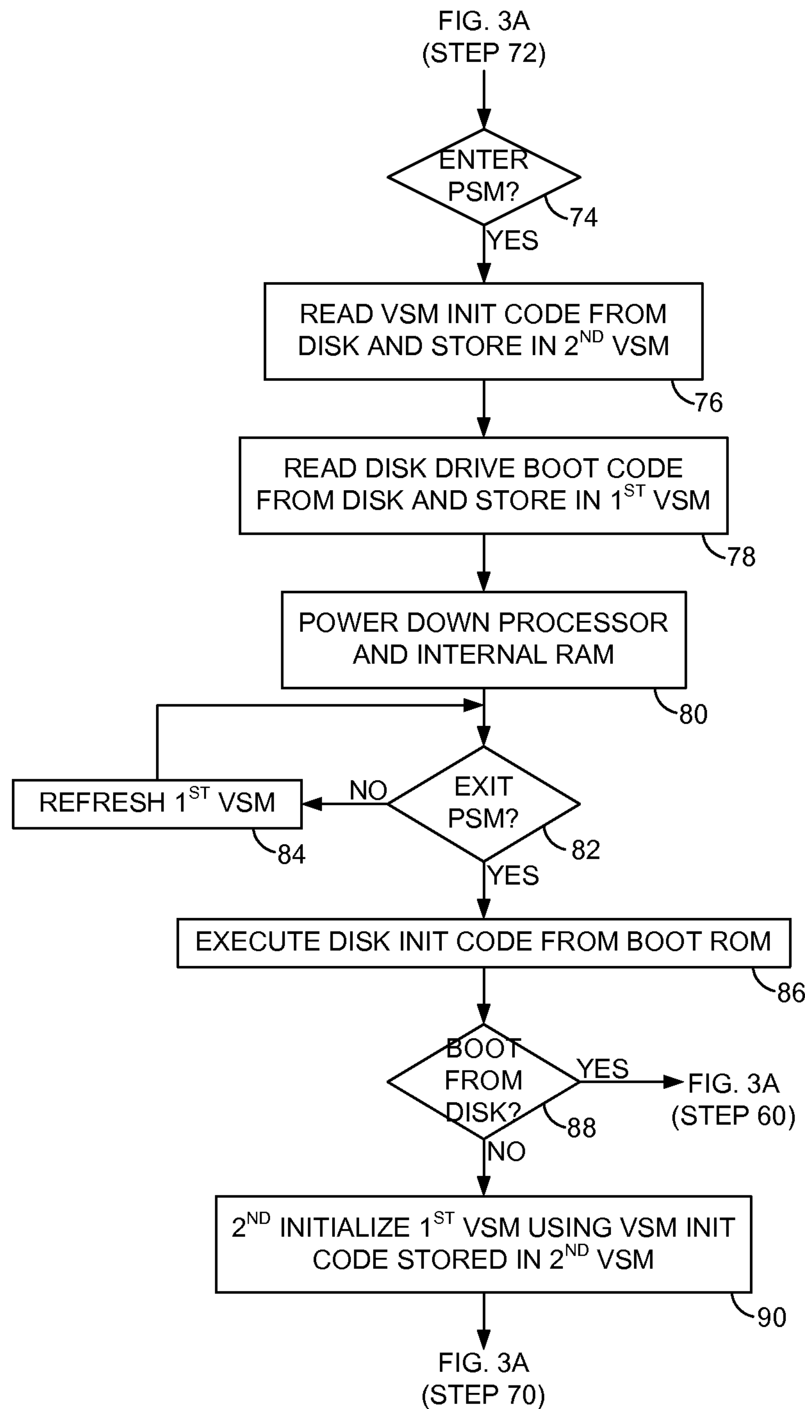

FIGS. 3A and 3B show a more detailed flow diagram according to an embodiment of the present invention, wherein when the disk drive is powered on (step 56), the disk initialization code is read from the boot ROM and executed (step 58). The control circuitry then spins up the disk (step 60), and waits for the disk to finish spinning up (step 62). The VSM initialization code is then read from the disk and stored in the internal RAM (step 64), and then executed from the internal RAM in order to first initialize the first VSM (step 66). Disk drive boot code (boot code needed to finish booting the disk drive) is then read from the disk and stored in the first VSM (step 68). The disk drive boot code stored in the first VSM is executed (step 70) in order to finish booting the disk drive. The boot code is then purged from the first VSM in order to free-up space in the first VSM (step 72).

Referring to FIG. 3B, when the disk drive is preparing to enter a power save mode (step 74), the VSM initialization code is read from the disk and stored in the second VSM (step 76). In an alternative embodiment, the VSM initialization code may be stored in the second VSM at step 64 of FIG. 3A, or the VSM initialization code may be stored in the first VSM at step 64 and then copied to the second VSM prior to entering the power save mode. The disk drive boot code (which was previously purged) is read from the disk and stored in the first VSM (step 78). The disk drive then enters the power save mode by powering down at least the processor 28 and the internal RAM 30 of FIG. 2A (step 80). The first VSM remains powered during the power save mode, and while the disk drive remains in the power save mode (step 82), the fist VSM is periodically refreshed (step 84), for example, by refresh logic 34 in the AOD 32 of FIG. 2A.

When the disk drive exits the power save mode, the disk initialization code is executed from the boot ROM (step 86). A determination is then made as to whether the control circuitry should continue booting from the disk (including whether to read the VSM initialization code from the disk). For example, the control circuitry may evaluate a flag stored in the AOD registers 36 to determine whether the VSM initialization code is stored in the second VSM and whether the disk drive boot code is stored in the first VSM (i.e., whether the disk drive is booting from power on or exiting a power save mode). If performing a power on boot, then the flow diagram of FIG. 3A is re-executed starting at step 60. If exiting the power save mode, the first VSM is reinitialized using the VSM initialization code stored in the second VSM (step 90). The flow diagram of FIG. 3A is then re-executed starting at step 70. That is, the disk drive boot code is executed from the first VSM (step 70) which avoids the latency of waiting for the disk to spin up at step 60.

Figure 4:
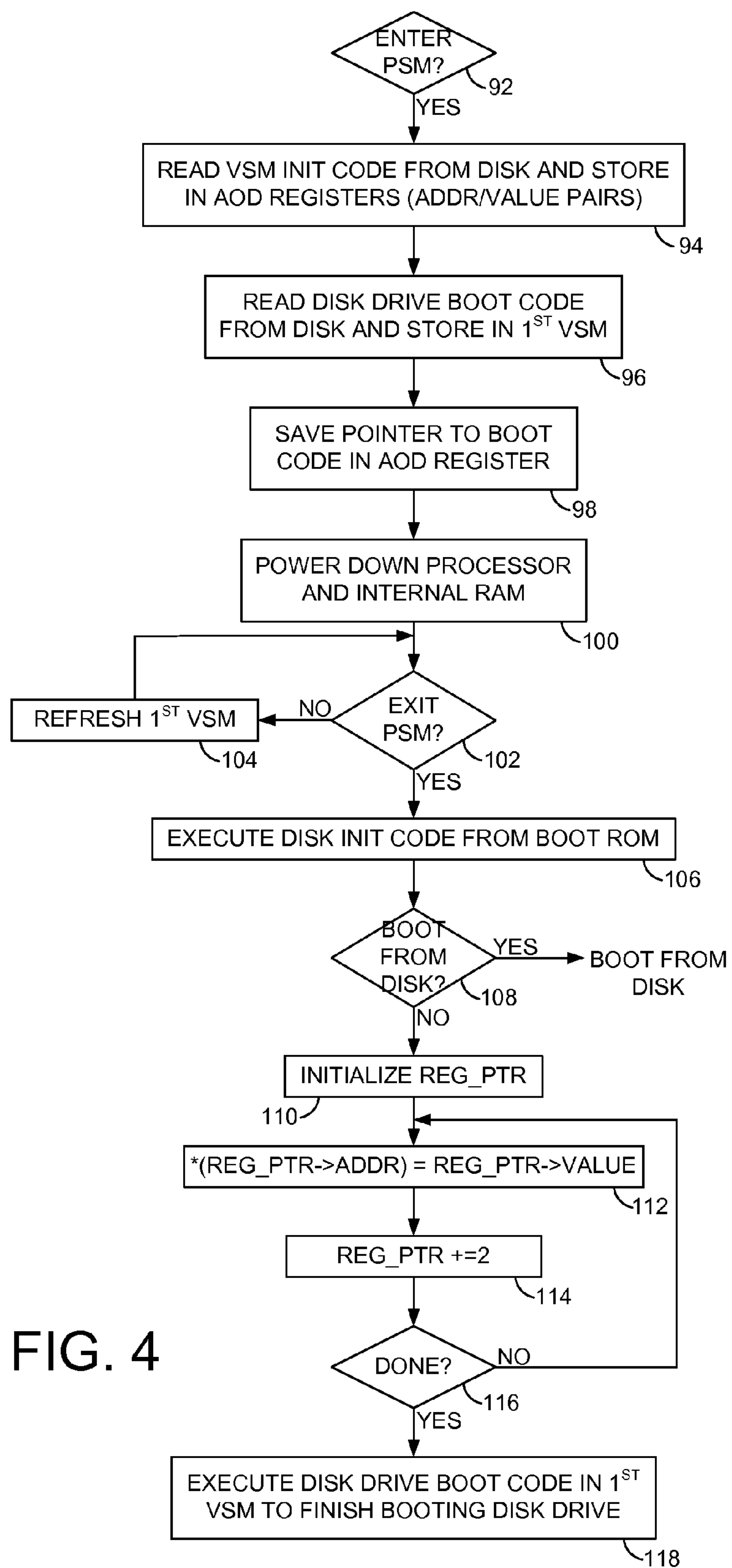
FIG. 4 is a flow diagram according to an embodiment of the present invention wherein the VSM initialization code is stored in the AOD registers as address/value pairs.

The VSM initialization code may be stored in the second VSM in any suitable format. In one embodiment, the second VSM comprises a plurality of AOD registers 36 (FIG. 2A) and the VSM initialization code is stored as a plurality of address/value pairs (an address in a first register, and a corresponding value in a second register). This embodiment is understood with reference to the flow diagram of FIG. 4, wherein when the disk drive is preparing to enter a power save mode (step 92), the VSM initialization code is read from the disk and stored in the AOD registers as address/value pairs (step 94). The disk drive boot code is also read from the disk and stored in the first VSM (step 96), and a pointer to the disk drive boot code is stored in an AOD register (step 98). The disk drive then enters the power save mode by powering down at least the processor 28 and the internal RAM 30 (step 100). While in the power save mode (step 102), the refresh logic 34 periodically refreshes the first VSM (step 104).

Upon exiting the power save mode, the disk initialization code is executed from the boot ROM (step 106). A flag is then evaluated (step 108) to determine whether the VSM initialization code is stored in the second VSM. If so, a pointer is initialized (step 110) to the first AOD register that stores the address/value pairs. The first address is then assigned the corresponding value stored in the next AOD register (step 112). The register pointer is incremented (step 114), and the process is repeated until all of the address/value pairs have been programmed (step 116) and the first VSM is ready to be accessed. The disk drive boot code stored in the first VSM is then executed (starting from the pointer saved at step 98) in order to finish booting the disk drive (step 118).

Figure 5:
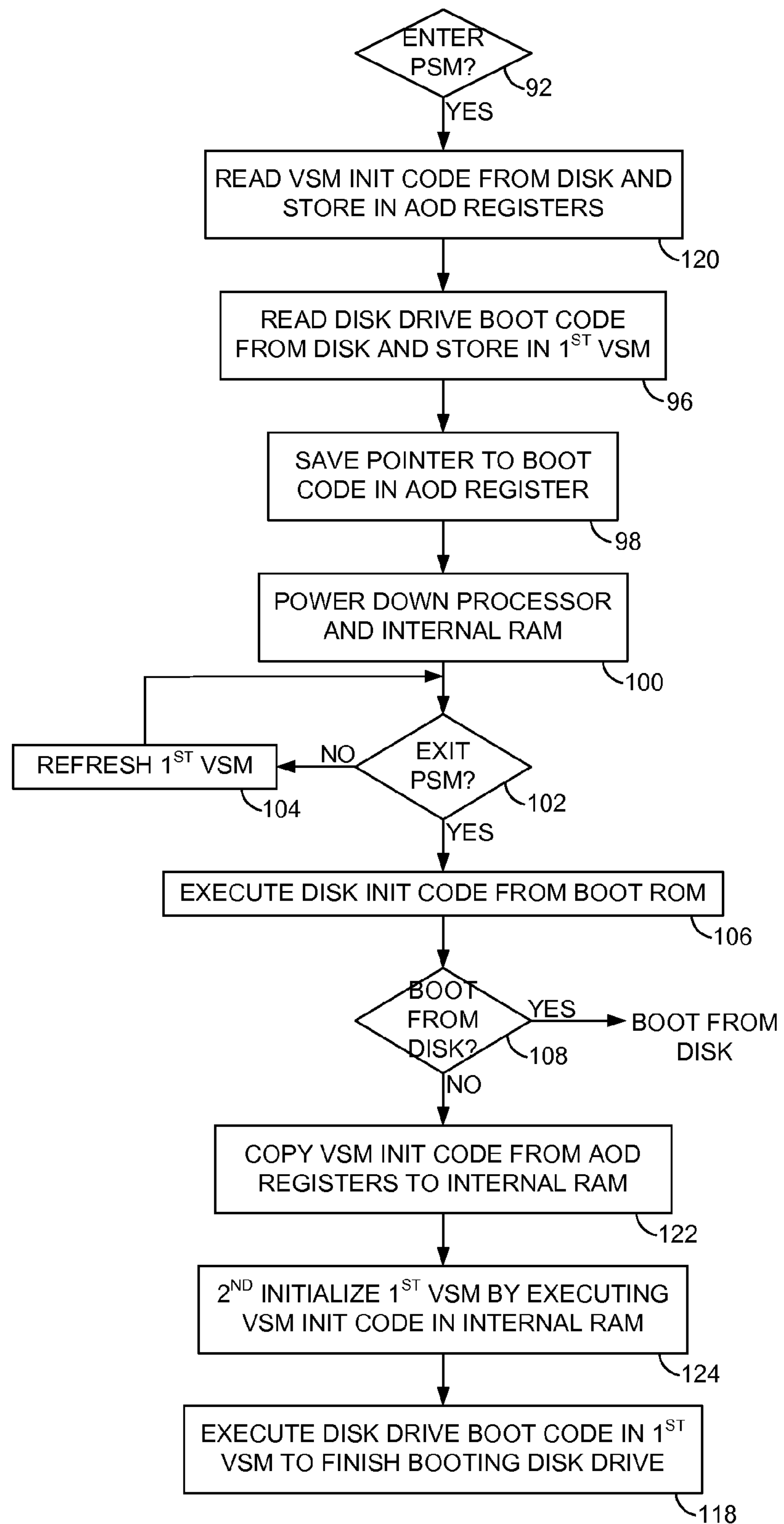
FIG. 5 is a flow diagram according to an embodiment of the present invention wherein the VSM initialization code is stored in the AOD registers, and then copied to the internal RAM of the SOC when exiting the power save mode.

FIG. 5 shows an alternative embodiment of the present invention, wherein when preparing to enter the power save mode (step 92), the VSM initialization code is stored in the AOD registers as executable code. When exiting the power save mode, the VSM initialization code stored in the AOD registers is copied (step 122) to the internal RAM 30 of the SOC 26 (FIG. 2A). The processor 28 then executes the VSM initialization code from the internal RAM 30 in order to reinitialize the first VSM (step 124).

In one embodiment, the VSM initialization code may be stored in the second VSM using any suitable error detection code (EDC) or any suitable error correction code (ECC). When exiting the power save mode, the VSM initialization code is first verified as being error free (or detected errors are corrected). If the VSM initialization code cannot be verified (or errors corrected), then the disk drive is booted normally by spinning up the disk and reading the VSM initialization code from the disk (step 64 of FIG. 3A). A similar EDC or ECC may be employed to verify the disk drive boot code stored in the first VSM when exiting the power save mode, and if the verification fails, the disk drive boot code is read from the disk (step 68 of FIG. 3A).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:

a disk;

a head actuated over the disk;

a first volatile semiconductor memory (VSM);

a second VSM; and control circuitry operable to:

when the disk drive is powered on, first read VSM initialization code from the disk;

first initialize the first VSM using the VSM initialization code;
store the VSM initialization code in the second VSM;
enter a power save mode; and
when exiting the power save mode, second initialize the first VSM using the VSM initialization code stored in the second VSM.

2. The disk drive as recited in claim 1, wherein when the disk drive is powered on the control circuitry is further operable to execute disk initialization code from a boot read only memory (ROM) in order to enable the reading of the VSM initialization code from the disk.

3. The disk drive as recited in claim 1, wherein:
the control circuitry comprises a microprocessor operable to execute the VSM initialization code; and
the control circuitry is further operable to power down the microprocessor when entering the power save mode.

4. The disk drive as recited in claim 1, wherein the control circuitry is further operable to refresh the first VSM while in the power save mode.

5. The disk drive as recited in claim 1, wherein in connection with entering the power save mode the control circuitry is further operable to:
second read the VSM initialization code from the disk; and
store the VSM initialization code in the second VSM after second reading the VSM initialization code from the disk.

6. The disk drive as recited in claim 1, wherein after first initializing the first VSM the control circuitry is further operable to:
first read disk drive boot code from the disk and store the disk drive boot code in the first VSM;
first execute the disk drive boot code from the first VSM prior to entering the power save mode; and
second execute the disk drive boot code from the first VSM after second initializing the first VSM.

7. The disk drive as recited in claim 6, wherein the control circuitry is further operable to:
purge the disk drive boot code from the first VSM after first executing the disk drive boot code; and
prior to entering the power save mode, second read the disk drive boot code from the disk and store the disk drive boot code in the first VSM.

8. The disk drive as recited in claim 1, wherein the second VSM comprises a plurality of registers.

9. The disk drive as recited in claim 8, wherein the control circuitry is further operable to store the VSM initialization code in the second VSM by storing an address in a first register and a corresponding value in a second register.

10. The disk drive as recited in claim 9, wherein the control circuitry is further operable to second initialize the first VSM by assigning the value stored in the second register to the address stored in the first register.

11. The disk drive as recited in claim 8, wherein the control circuitry is further operable to second initialize the first VSM by copying the VSM initialization code from the registers to an internal memory and executing the VSM initialization code from the internal memory.

12. A method of operating a disk drive, the disk drive comprising a head actuated over a disk, a first volatile semiconductor memory (VSM), and a second VSM, the method comprising:
when the disk drive is powered on, first reading VSM initialization code from the disk;
first initializing the first VSM using the VSM initialization code;
storing the VSM initialization code in the second VSM;
entering a power save mode; and
when exiting the power save mode, second initializing the first VSM using the VSM initialization code stored in the second VSM.

13. The method as recited in claim 12, wherein when the disk drive is powered on further comprising executing disk initialization code from a boot read only memory (ROM) in order to enable the reading of the VSM initialization code from the disk.

14. The method as recited in claim 12, wherein:
the disk drive comprises a microprocessor operable to execute the VSM initialization code; and
further comprising powering down the microprocessor when entering the power save mode.

15. The method as recited in claim 12, further comprising refreshing the first VSM while in the power save mode.

16. The method as recited in claim 12, wherein in connection with entering the power save mode further comprising:
second reading the VSM initialization code from the disk; and
storing the VSM initialization code in the second VSM after second reading the VSM initialization code from the disk.

17. The method as recited in claim 12, wherein after first initializing the first VSM further comprising:
first reading disk drive boot code from the disk and storing the disk drive boot code in the first VSM;
first executing the disk drive boot code from the first VSM prior to entering the power save mode; and
second executing the disk drive boot code from the first VSM after second initializing the first VSM.

18. The method as recited in claim 17, further comprising:
purging the disk drive boot code from the first VSM after first executing the disk drive boot code; and
prior to entering the power save mode, second reading the disk drive boot code from the disk and storing the disk drive boot code in the first VSM.

19. The method as recited in claim 12, wherein the second VSM comprises a plurality of registers.

20. The method as recited in claim 19, further comprising storing the VSM initialization code in the second VSM by storing an address in a first register and a corresponding value in a second register.

21. The method as recited in claim 20, further comprising second initializing the first VSM by assigning the value stored in the second register to the address stored in the first register.

22. The method as recited in claim 19, further comprising second initializing the first VSM by copying the VSM initialization code from the registers to an internal memory and executing the VSM initialization code from the internal memory.

* * * * *